United States Patent
Ringwall

[11] 3,817,480
[45] June 18, 1974

[54] GAIN CHANGER FOR ANGLE-OF-ATTACK/ATTITUDE FLUIDIC FLIGHT CONTROL SYSTEM

[75] Inventor: Carl Gustave Ringwall, Scotia, N.Y.

[73] Assignee: General Electric Company, New York, N.Y.

[22] Filed: May 30, 1972

[21] Appl. No.: 257,661

[52] U.S. Cl............ 244/78, 137/805, 235/200 PF, 244/79
[51] Int. Cl.............................................. B64c 13/40
[58] Field of Search........... 244/78, 79, 77 A, 77 D; 235/200 R, 200 PF, 201 R, 201 FS, 201 PF; 137/805, 815, 816, 819, 821; 73/515; 74/5, 5.7

[56] References Cited
UNITED STATES PATENTS

| | | | |
|---|---|---|---|
| 3,079,758 | 3/1963 | Vogel et al. | 244/78 X |
| 3,094,300 | 6/1963 | Osder | 244/77 D |
| 3,165,282 | 1/1965 | Noyes | 244/79 |
| 3,254,864 | 6/1966 | Kent et al. | 244/78 |
| 3,395,719 | 8/1968 | Boothe et al. | 235/200 PF |

Primary Examiner—Milton Buchler
Assistant Examiner—Barry L. Kelmachter
Attorney, Agent, or Firm—P. L. Schlamp; R. G. Simkins; F. L. Neuhauser

[57] ABSTRACT

An angle-of-attack/attitude fluidic flight control system with gain changer means for compensating for output signal sensitivity to flight velocity variations including angle-of-attack sensor means for generating an output signal sensitive to the flight velocity and the angle-of-attack of a vehicle in flight, gyro means fluidically connected to the angle-of-attack sensor means for receiving a fluid pressure supply therefrom, the gyro means providing an output signal sensitive to the flight velocity and the attitude of the vehicle in flight, summer-integrator means having an input fluidically connected to the angle-of-attack sensor means and the gyro means for receiving the output signals therefrom, the output signals from the angle-of-attack sensor means and the gyro means being compared at the input of the summer-integrator means, and the summer-integrator means having an output connectable to actuator means for providing thereto correction signals for maintaining through operation of the actuator means the desired angle-of-attack and attitude of the vehicle in flight.

9 Claims, 1 Drawing Figure

PATENTED JUN 18 1974 3,817,480
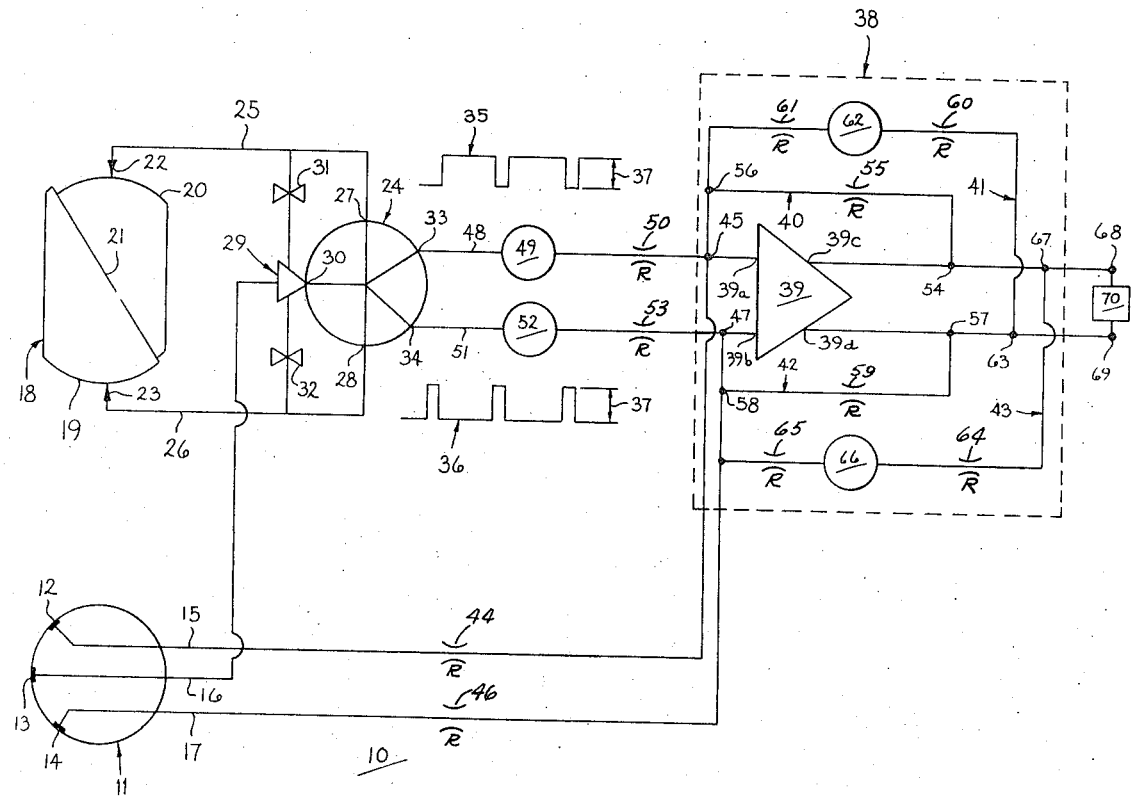

GAIN CHANGER FOR ANGLE-OF-ATTACK/ATTITUDE FLUIDIC FLIGHT CONTROL SYSTEM

BACKGROUND OF THE INVENTION

1. Field Of The Invention

This invention relates to fluidic flight control systems, and more particularly to an angle-of-attack/attitude flight control system wherein means are provided to compensate for the flight velocity sensitivity of the angle-of-attack sensor.

2. Description Of The Prior Art

In accordance with the prior art, the flight of vehicles has been controlled here-to-date through the use of various means. One common manner of accomplishing flight control of a vehicle has been by means of electrical flight control systems. However, as advances have been achieved in the technology relating to the field of fluidics, work has been done most recently toward the development of all fluidic flight control systems. Work in this direction has been motivated primarily by the fact that the fluidic components used in such fluidic systems possess certain inherent advantages over the mechanical and/or electrical components normally utilized heretofore in flight control systems.

Thus, for example, fluidic components feature inherent reliability and long life since they generally employ no moving parts. Further, they can be produced at low cost due to their ease of fabrication from virtually any material that is nonporous and has structural rigidity. As a result, such devices are ideal for application in flight control systems where nuclear radiation, high temperature, vibration, and/or shock may be present. Another advantageous characteristic of fluidic components resides in the flexibility they possess inasmuch as generally they may be operated either as pneumatic devices employing a compressible fluid, such as air or gas, or as hydraulic devices utilizing an incompressible fluid, such as water or oil.

In order to maintain the desired flight path of a vehicle, be the vehicle a missile or an aircraft, the flight control system for the vehicle must normally be capable of sensing deviations in both the attitude and the angle-of-attack of the vehicle. Commonly deviations in attitude are determined through the use of an attitude gyro which is suitably housed somewhere within the interior of the vehicle. Deviations in the angle-of-attack of the vehicle are determined on the other hand from sensing the pressure differential existing across a pair of sensing ports suitably provided for this purpose generally somewhere along the surface of the forward portion of the vehicle. As such, the angle-of-attack sensors are sensitive to changes in the flight velocity of the vehicle. That is, it has been found that the fluidic angle-of-attack sensor output level varies with flight velocity as well as angle-of-attack and thus exhibits total pressure sensitivity. In flight control systems where flight speed varies significantly, the output of the angle-of-attack sensor must be compensated at some point in the control system to make the system practical. A conventional approach in electrical flight control systems would be to divide the angle-of-attack sensor output by the total pressure. However, this manipulation is not feasible with fluidic components because of the absence in the fluidic art of a practical fluidic component capable of performing a division function. There thus exists a need for providing an all fluidic flight control system capable of providing in some other fashion the aforedescribed compensation for the flight velocity sensitivity of the angle-of-attack sensor.

OBJECTS OF THE INVENTION

It is therefore an object of the present invention to provide a novel and improved flight control system for a vehicle wherein fluidic circuit means are provided to sense the orientation of the vehicle during flight.

It is another object of the present invention to provide such a flight control system wherein the fluidic circuit means generates a correction signal when the vehicle is sensed to have deviated from its desired orientation.

A further object of the present invention is to provide such a flight control system wherein the fluidic circuit means senses both the angle-of-attack and the attitude of the vehicle during flight.

A still further object of the present invention is to provide such a flight control system wherein the fluidic circuit means includes gain changer means capable of compensating for the flight velocity sensitivity of the angle-of-attack sensor.

Yet another object of the present invention is to provide such a flight control system which is characterized by its reliability of operation, flexibility of application, and relatively low cost.

SUMMARY OF THE INVENTION

In carrying out the invention in one form, a fluidic flight control system is provided which functions to sense the orientation of a vehicle during flight and to generate a correction signal when the vehicle is sensed to have deviated from its desired orientation in flight. More specifically, to have deviated from its desired orientation in flight. More specifically, the subject fluidic flight control system monitors the orientation of the vehicle during flight by sensing both the angle-of-attack and the attitude thereof. The fluidic flight control system includes angle-of-attack sensor means for generating an output signal sensitive to the flight velocity and the angle-of-attack of the vehicle in flight. A gyro means is provided fluidically connected to the angle-of-attack sensor means for receiving a fluid pressure supply therefrom. The gyro means provides an output signal which is sensitive to the attitude of the vehicle in flight and which signal is made sensitive to the flight velocity of the vehicle. A summer-integrator means is fluidically connected to the angle-of-attack sensor means and the gyro means. The output signals from the angle-of-attack sensor means and the gyro means are compared at the input of the summer-integrator means to eliminate from the signals the portion thereof which is imparted thereto from a sensing of the flight velocity of the vehicle. The output of the summer-integrator means is connectable to actuator means for providing thereto correction signals obtained from the output of the summer-integrator means for controlling the operation of the actuator means to maintain the desired orientation of the vehicle in flight as reflected in the angle-of-attack and the attitude thereof.

The invention will be more fully understood from the following detailed description and its scope will be pointed out in the appended claims.

BRIEF DESCRIPTION OF THE DRAWING

The FIGURE is a schematic representation of a flight control system, including means for compensating for the flight velocity sensitivity of the angle-of-attack sensor, constructed in accordance with the present invention.

DESCRIPTION OF A PREFERRED EMBODIMENT

Referring now to the drawing there is diagrammatically illustrated therein a fluidic flight control system, generally designated by reference numeral 10, constructed in accord with the present invention. The control system 10 shown is capable of monitoring the orientation of a vehicle during flight, be the vehicle a missile or an aircraft, by sensing the angle-of-attack and the attitude of the vehicle to thereby detect when the vehicle deviates from the desired orientation, and to generate in response thereto an appropriate output signal employable to control suitable actuator means to restore the vehicle to its proper orientation.

As depicted in the drawing, flight control system 10 is provided with angle-of-attack sensor means comprising an angle-of-attack sensor 11 including a plurality of openings 12, 13 and 14. In accord with one embodiment of the invention, the openings 12, 13 and 14 are suitably provided along the surface of the forward portion of a vehicle (not shown) equipped with control system 10 such that each of the openings 12, 13 and 14 lies in juxtaposed relation to the path of the ram air flow adjacent the vehicle as the latter moves in flight. As the ram air flows past the openings 12, 13 and 14, some of this flow of ram air is entrained in each of the openings 12, 13 and 14. The entrained ram air is then transmitted, in a manner to be more fully described hereinbelow, from openings 12, 13 and 14 through pipe means 15, 16 and 17 each of which has one end thereof connected to a corresponding one of the openings 12, 13 and 14.

Angle-of-attack sensor 11 provides an output signal therefrom which is proportional to the total pressure of the ram air sensed thereby. This output signal comprises the differential pressure existing at a given moment between the pressure of the ram air present in pipe means 15 and that present in pipe means 17. Since the level of the output signal from angle-of-attack sensor 11 is proportional to the total pressure of the ram air, sensor 11 may be said to exhibit total pressure sensitivity. Thus, the level of the output signal from the fluidic sensor 11 varies with the flight velocity of the vehicle as well as with changes in the angle-of-attack of the vehicle. Accordingly, for application in flight control systems wherein flight speed of the vehicle varies significantly, the output of the sensor 11 must be compensated at some point in the control system to provide an operable system which is practical. As noted hereinabove, a conventional approach in non-fluidic flight control systems would be to divide the sensor output by the total pressure. However, it is not possible to perform this manipulation at present with the fluidic operational amplifiers currently available in the prior art. There is therefore provided in accordance with the present invention a flight control system 10 wherein compensation for the total pressure sensitivity, i.e., flight speed sensitivity of the angle-of-attack sensor 11 is provided elsewhere in the flight control circuit.

Referring again to the drawing, flight control system 10 further includes an attitude sensing means comprising an attitude gyro 18. As depicted in the drawing, attitude gyro 18 may take the form of the gyro which constitutes the subject matter of the invention described and illustrated in my copending U.S. patent application, Ser. No. 12,241, filed Feb. 18, 1970, now U.S. Pat. No. 3,672,235 and assigned to the same assignee as the present invention. As such, gyro 18 comprises a substantially spherical mass including a first hemisphere portion 19 having a first radius and a second hemisphere portion 20 having a radius less than that of portion 19. The hemisphere portions 19 and 20 are joined together along a great circle 21 whereby to provide gyro 18 with a discontinuity along its surfaces. As more fully described in my afore-referenced copending patent application, gyro 18 rotates in an ambient fluid (not shown) along its axis of rotation. Fluidic pickoffs 22 and 23 are positioned adjacent to the substantially spherical mass of gyro 18 and sense the pressure change induced by the change in radius of the surface of the gyro 18. The gap between the fluidic pickoff 22 and the surface of rotating gyro 18 controls the pressure level sensed by the pickoff 22. Similarly, the pressure level sensed by pickoff 23 is dependent upon the gap which exists between pickoff 23 and the portion of the surface of the rotating gyro 18 passing thereby. As will be described more fully hereinbelow, a large gap induces a low level signal and a small gap induces a high level signal.

In a manner well-known to those skilled in the art, gyro 18 is suitably mounted within the vehicle (not shown) equipped with the flight suitably mounted within the vehicle (not shown) equipped with the flight control system 10 such that gyro 18 is responsive to the attitude of the vehicle. Thus, attitude gyro 18 functions to sense the attitude of the vehicle and to provide an output signal indicative thereof. More particularly, the output signal of gyro 18 comprises the pressure level differential of the pressures sensed by pickoffs 22 and 23. This output signal is fed from attitude gyro 18 to a fluidic proportional amplifier 24 by means of pipe means 25 and 26. As illustrated in the drawing, pipe means 25 has one end thereof connected to fluidic pickoff 22 and the other end connected to control port 27 of amplifier 24, while pipe means 26 has one end thereof connected to pickoff 23 and the other end thereof connected to control port 28 of amplifier 24.

As described previously, pipe means 16 has one end thereof connected to opening 13 of angle-of-attack sensor 11 whereby a portion of the ram air which flows past the opening 13 is entrained therein and is thereby fed to pipe means 16. The other end of pipe means 16 is connected to valve means 29 and therethrough to the power supply input port 30 of amplifier 24 whereby air at a pressure level proportional to the total pressure of the ram air is transmitted by pipe means 16 from opening 13 to input port 30 of amplifier 24. This flow of air derived from the ram air flow past opening 13 comprises the fluidic power supply of amplifier 24. As such, the pressure level of the fluid power supply of amplifier 24 is therefore proportional to the total pressure of the ram air, and accordingly will vary in similar fashion as does the level of the output signal of angle-of-attack sensor 11 with changes in the flight velocity of the vehicle.

With further reference to the drawing, it can be seen therefrom that valve means 29 is also connected across pipe means 25 and 26 and in series with a pair of fluidic, fixed resistors 31 and 32. A portion of the air flow through pipe means 16 is thus fed through valve means 29 and fixed resistors 31 and 32 to pipe means 25 and 26 and thereby ultimately to the fluidic pickoffs 22 and 23. In this manner, since the pressure of the air flow in pipe means 16 is, as described in the preceding paragraph, proportional to the total pressure of the ram air, the pulse height of the output signal provided by attitude gyro 18 is also made proportional to the total pressure of the ram air.

In accordance with the embodiment of the invention depicted in the drawing, the output signal generated by gyro 18 is in the form of a pulse-width-modulated signal. This signal in the manner described previously is thereafter fed to control ports 27 and 28 of amplifier 24 and therethrough to the interior of amplifier 24 whereupon it functions to control the fluidic power supply flow applied to amplifier 24 through port 30 and thereby to determine the nature of the output provided at the output ports 33 and 34 of amplifier 24. Inasmuch as amplifier 24 constitutes a conventional fluidic proportional amplifier whose construction and mode of operation is well-known to those skilled in the art of fluidics, it is not deemed necessary to include herein any further description of the construction and mode of operation of amplifier 24.

To provide a better understanding of the nature of the outputs provided from the output ports 33 and 34 of amplifier 24 the wave forms of the outputs from these ports have been depicted in the drawing. Thus, the waveform designated by reference numeral 35 depicts the waveform of the output provided from output port 33 of amplifier 24 while the waveform designated by numeral 36 depicts the waveform of the output port 34. The pulse height, which is denoted by the arrow identified by numeral 37 in the drawing, of each of the waveforms 35 and 36 is proportional to the total pressure of the ram air sensed at the opening 13 of the angle-of-attack sensor 11. Thus, the pulse height 37 varies with the flight velocity of the vehicle and the pulse width with variations in the attitude of the vehicle sensed by attitude gyro 18.

Turning again to the drawing, it can be seen therefrom that angle-of-attack sensor 11 and attitude gyro 18 are each fluidically connected to the input portion of a summer-integrator means which comprises the portion of flight control system 10 depicted within the dash lines identified by reference numeral 38. As will be more fully described subsequently, summer-integrator means 38 includes a fluidic gain block 39 subsequently, summer-integrator means 38 includes a fluidic gain block 39 and a plurality of feedback paths generally identified in the drawing by reference numerals 40, 41, 42 and 43.

Thus it is seen from the drawing that pipe means 15 of angle-of-attack sensor 11 is connected through fluidic resistor 44 to the junction 45, and that pipe means 16 of sensor 11 is connected through fluidic resistor 46 to the junction 47. In similar fashion, pipe means 48 connects the output port 33 of amplifier 24 through fluidic capacitor 49 and fluidic resistor 50 to junction 45 while the output port 34 of amplifier 24 is connected by pipe means 51 through fluidic capacitor 52 and fluidic resistor 53 to junction 47. Accordingly, the output signal from angle-of-attack sensor 11 which is proportional to the total pressure of the ram air sensed by sensor 11 is transmitted by means of pipe means 15 and 16 to the junctions 45 and 47. Likewise, the output signal from attitude gyro 18 is fed to amplifier 24 and therefrom by means of pipe means 48 and 51 to the junctions 45 and 47. As previously described, this output received at junctions 45 and 47 from amplifier 24 is also proportional to the total pressure of the ram air sensed by sensor 11. Further, it will be noted that the signals generated by angle-of-attack sensor 11 and attitude gyro 18 are both in differential form.

The outputs generated by angle-of-attack sensor 11 and attitude gyro 18 are thus applied through junctions 45 and 47 to the input of summer-integrator means 38 and more particularly to the input of gain block 39. Here the attitude and angle-of-attack signals are compared. That is, the two signals are subtracted whereby the effect of variations in the total pressure of the ram air is cancelled. Thus, the ouput from summer-integrator means 38 is the difference between the attitude signal generated by gyro 18 and the angle-of-attack signal provided by sensor 11 with the effect thereon caused by variations in the flight velocity of the vehicle having been eliminated therefrom. Thus, compensation for the total pressure sensitivity of angle-of-attack sensor 11 is accomplished by providing a gain change in the attitude signal generated by gyro 18. In accordance therewith, the height of the attitude pulse signal is made proportional to the total pressure of the ram air by employing the portion of the ram air entrained by opening 13 of sensor 11 as the supply pressure to amplifier 24 which is fluidically connected in circuit between the gyro 18 and summer-integrator means 38. The output level of amplifier 24 and the output level of the angle-of-attack sensor 11 thus track and are cancelled at the input of summer-integrator means 38 since the signals are subtracted at this point.

To complete the description of the construction of summer-integrator means 38, it can be seen from the drawing that summer-integrator means 38 in accordance with conventional practice includes a gain block 39 and a plurality of feedback paths 40, 41, 42 and 43 interconnecting the outputs of gain block 39 with the inputs thereof. Gain block 39 is provided with a pair of inputs 39a and 39b, and a pair of outputs 39c and 39d. Feedback path 40 is connected by means of junction 54 from output 39c of gain block 39 through fluidic resistor 55 to junction 56 and therethrough to junction 45 which in turn is connected to the input 39a of the gain block 39. In similar fashion, one end of feedback path 42 is connected by means of junction 57 to output 39d of gain block 39 while the other end thereof is connected through junction 58 to junction 47 and thereby to input 39b of gain block 39. Fluidic resistor 59 is connected in feedback path 42 between junctions 57 and 58. On the other hand feedback path 41 which has connected therein fluidic resistors 60 and 61 and fluidic capacitor 62 is connected by means of junction 63 from the output 39d of gain block 39 to junction 45 and thereby to input 39a of the gain block 39. Finally, feedback path 43 which has connected therein fluidic resistors 64 and 65 and fluidic capacitor 66 is connected by means of junction 67 from the output 39c of gain block 39 to junction 47 and thereby to the input 39b of the gain block 39.

In accordance with the embodiment of the invention depicted in the drawing, summer-integrator means 38 is provided with a pair of terminals 68 and 69 connectable to actuator means 70. The terminals 68 and 69 thus function to apply the output from summer-integrator means 38 to actuator means 70 in the form of correction signals for intiating operation of the means 70 in the form of correction signals for intiating operation of the actuator means 70 which in turn are suitably connected to the control means (not shown) of the vehicle to thereby enable the flight path of the vehicle to be varied whereby to maintain the desired orientation of the vehicle insofar as concerns the angle-of-attack and/or the attitude thereof.

Thus, there has been provided in accordance with the present invention a novel and improved flight control system wherein fluidic circuit means are provided to sense the orientation of the vehicle during flight and wherein the fluidic circuit means generates a correction signal when the vehicle is sensed to have deviated from its desired orientation. More particularly, the flight control system in accord with the present invention includes fluidic circuit means which sense both the angle-of-attack and the attitude of the vehicle during flight. In addition the flight control system of the present invention is provided with gain changer means capable of compensating for the flight velocity sensitivity of the angle-of-attack sensor. Finally in accord with the present invention there has been provided a flight control system which is characterized by its reliability of operation, flexibility of application, and relatively low cost.

While only one embodiment of my invention has been specifically illustrated in the drawing of the instant application, it will be appreciated that modifications thereof may readily be made therein by those skilled in the art. For example, although the attitude signal generated by attitude gyro 18 has been described hereinabove as being a pulse-width-modulated signal, the concept embodied in the subject invention is equally applicable to other forms of flight control signals wherein the signal from the attitude gyro comprises an analog signal. Also, although specific examples of fluidic components and actuator means have been decribed above and illustrated in the drawing, it is also contemplated within the scope of the present invention that other fluidic components and actuator means may be substituted therefor. In this connection, these other components and actuator means may take the form of mechanical and/or electrical devices or combinations thereof. In addition, although the subject invention has been described in connection with a flight control system for sensing deviations in the flight of a vehicle, the invention is not limited thereto. It is to be recognized that the invention in its broader aspects may be employed in other forms of control systems for sensing deviations in the orientation of a moving vehicle. Thus, it will be appreciated that many other modifications of my invention may readily be made by those skilled in the art, and I therefore intend by the appended claims to cover the above suggested modifications as well as all other modifications which fall within the true spirit and scope of my invention.

What I claim as new and desire to secure by Letters Patent of the United States is:

1. A fluidic flight control system for sensing deviations in the orientation of a vehicle during flight comprising:
   a. angle-of-attack sensor means for monitoring the angle-of-attack of the vehicle, said angle-of-attack sensor means generating an output signal sensitive to the flight velocity and the angle-of-attack of the vehicle, said output signal comprising a fluidic pressure differential signal;
   b. attitude gyro means for monitoring the attitude of the vehicle, said attitude gyro means generating a fluidic pressure differential output signal sensitive to the attitude of the vehicle;
   c. circuit means fluidically connecting said angle-of-attack sensor means in circuit relationship with said attitude gyro means such that said output signal from said attitude gyro means is made sensitive also to the flight velocity of the vehicle;
   d. summer-integrator means connected fluidically in circuit relationship with said angle-of-attack sensor means for receiving said output signal therefrom and connected fluidically in circuit relationship with said attitude gyro means for receiving said output signal therefrom;
   e. said summer-integrator means including input means wherein said output signal from said angle-of-attack means and said output signal from attitude gyro means are subtracted thereby causing to be cancelled from said output signals the effects thereon of the sensitivity of said output signals to the flight velocity of the vehicle; and
   f. said summer-integrator means providing an output therefrom corresponding solely to the difference between the angle-of-attack of the vehicle sensed by said angle-of-attack sensor means and the attitude of the vehicle sensed by said attitude gyro means.

2. A fluidic flight control system as set forth in claim 1 further comprising terminal means connected in circuit relationship with said summer-integrator means for receiving said output therefrom, said terminal means being connectable to actuator means for applying said output from said summer-integrator means thereto to thereby control the operation of said actuator means whereby to maintain the vehicle in a desired orientation during flight.

3. A fluidic flight control system as set forth in claim 1 wherein:
   a. said attitude gyro means comprises an attitude gyro, a pair of pickoffs, and a fluidic proportional amplifier;
   b. said pair of pickoffs is positioned in juxtaposed relation to the surface of said attitude gyro to sense the attitude of the vehicle as reflected by said attitude gyro;
   c. said fluidic proportional amplifier includes a power supply input, a pair of control ports, and a pair of output ports;
   d. said pair of control ports is fluidically connected in circuit relationship to said pair of pickoffs; and
   e. said pair of output ports is fluidically connected in circuit relationship to said input means of said summer-integrator means.

4. A fluidic flight control system as set forth in claim 3 wherein:

a. said circuit means fluidically connects said angle-of-attack sensor means to said power supply input of said fluidic proportional amplifier;
b. the fluid power supply for said fluidic proportional amplifier is supplied from said angle-of-attack sensor means;
c. said summer-integrator means comprises a fluidic gain block, and a plurality of feedback paths connected in circuit relationship with said fluidic gain block;
d. said fluidic gain block includes said input means for receiving said output signal from said angle-of-attack sensor means and said output signal from said attitude gyro means; and
e. said output from said summer-integrator means is provided from said fluidic gain block.

5. A fluidic flight control system for sensing deviations in the orientation of a moving vehicle comprising:

a. angle-of-attack sensor means for monitoring the angle-of-attack of the vehicle, said angle-of-attack sensor means generating an output fluidic signal sensitive to the flight velocity and the angle-of-attack of the vehicle;
b. attitude gyro means for monitoring the attitude of the vehicle, said attitude gyro means generating an output fluidic signal sensitive to the attitude of the vehicle;
c. circuit means fluidically connecting said angle-of-attack sensor means in circuit relationship with said attitude gyro means such that said output signal from said attitude gyro means is made sensitive also to the flight velocity of the vehicle;
d. summer-integrator means connected fluidically in circuit relationship with said angle-of-attack sensor means for receiving said output signal therefrom and connected fluidically in circuit relationship with said attitude gyro means for receiving said output signal therefrom;
e. said summer-integrator means including input means wherein said output signal from said angle-of-attack sensor means and said output signal from said attitude gyro means are subtracted thereby causing to be cancelled from said output signals the effects thereon of the sensitivity of said output signals to the flight velocity of the vehicle;
f. said summer-integrator means providing an output therefrom corresponding solely to the difference between the angle-of-attack of the vehicle sensed by said angle-of-attack sensor means and the attitude of the vehicle sensed by said attitude gyro means; and
g. actuator means connected in circuit relationship with said summer-integrator means for receiving said output therefrom to thereby control the operation of said actuator means whereby to maintain the vehicle in a desired orientation during movement.

6. A control system as set forth in claim 5 wherein:

a. said attitude gyro means comprises an attitude gyro, a pair of pickoffs, and a fluidic proportional amplifier;
b. said attitude gyro includes a first hemisphere portion having a first radius and a second hemisphere portion having a radius less than said first radius, said first hemisphere portion and said second hemisphere portion being joined together to provide a discontinuity in the surface of said attitude gyro; and
c. said pair of pickoffs is positioned in juxtaposed relation to the surface of said attitude gyro to sense the attitude of the vehicle as reflected by said attitude gyro.

7. A control system as set forth in claim 6 wherein:

a. said fluidic proportional amplifier includes a power supply input, a pair of control ports, and a pair of output ports;
b. said pair of control ports is fluidically connected in circuit relationship to said pair of pickoffs; and
c. said pair of output ports is fluidically connected in circuit relationship to said input means of said summer-integrator means.

8. A control system as set forth in claim 7 wherein:

a. said circuit means fluidically connects said angle-of-attack sensor means to said power supply input of said fluidic proportional amplifier; and
b. the fluid power supply for said fluidic proportional amplifier is supplied from said angle-of-attack sensor means.

9. A control system as set forth in claim 8 wherein:

a. said summer-integrator means comprises a fluidic gain block and a plurality of feedback paths connected in circuit relationship with said fluidic gain block;
b. said fluidic gain block includes said input means for receiving said output from said angle-of-attack sensor means and said output signal from said attitude gyro means; and
c. said output from said summer-integrator means is provided from said fluidic gain block.

* * * * *

UNITED STATES PATENT OFFICE
CERTIFICATE OF CORRECTION

Patent No. 3,817,480　　　　　　　　　　Dated June 18, 1974

Inventor(s) Carl G. Ringwall

It is certified that error appears in the above-identified patent and that said Letters Patent are hereby corrected as shown below:

Column 4, lines 34-35　　after "equipped with the flight", first occurrence, omit - suitably mounted within the vehicle (not shown) equipped with the flight -

Claim 9, line 7,　　after "output" insert -signal -

Signed and sealed this 8th day of October 1974.

(SEAL)
Attest:

McCOY M. GIBSON, JR.　　　　　　　　　　C. MARSHALL DANN
Attesting Officer　　　　　　　　　　　　Commissioner of Patents